Oct. 11, 1955 A. S. KING 2,720,058
HONING MACHINE
Filed Aug. 13, 1952
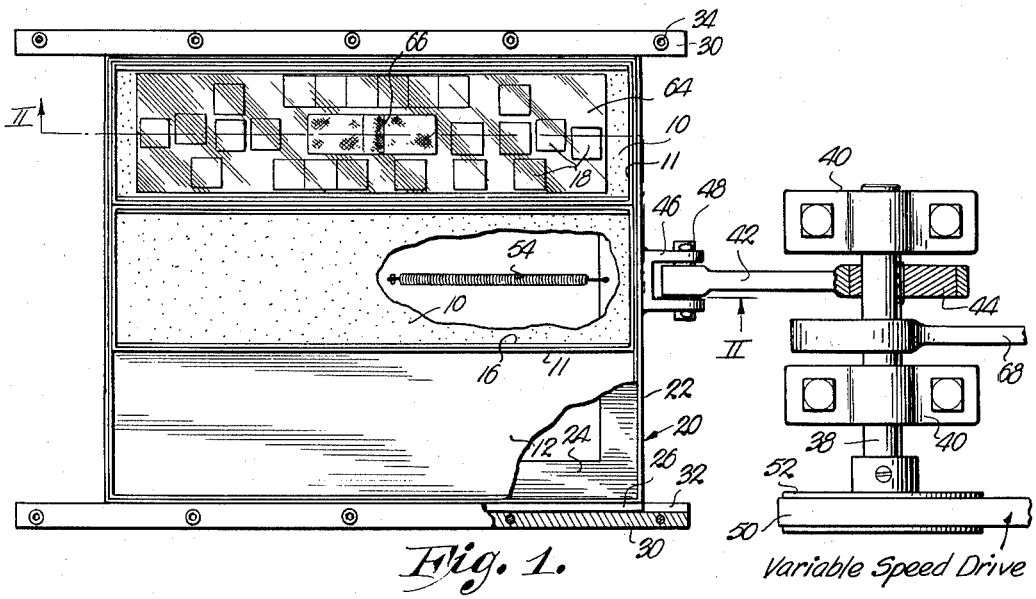
Fig. 1. Variable Speed Drive
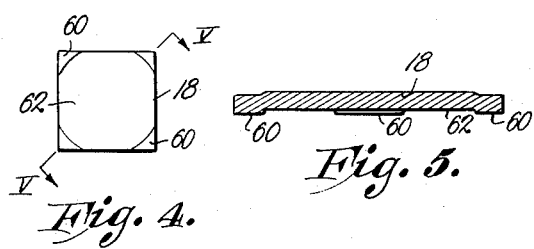
Fig. 4. Fig. 5.
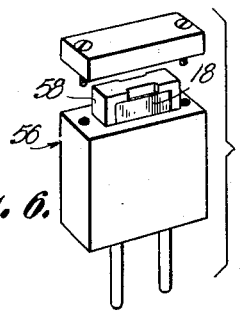
Fig. 6.
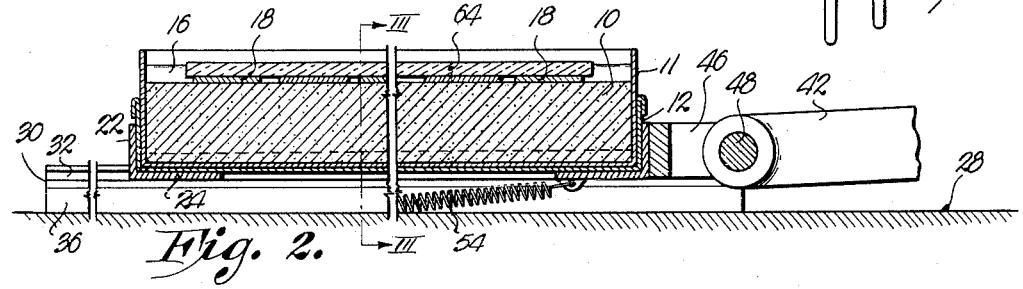
Fig. 2.
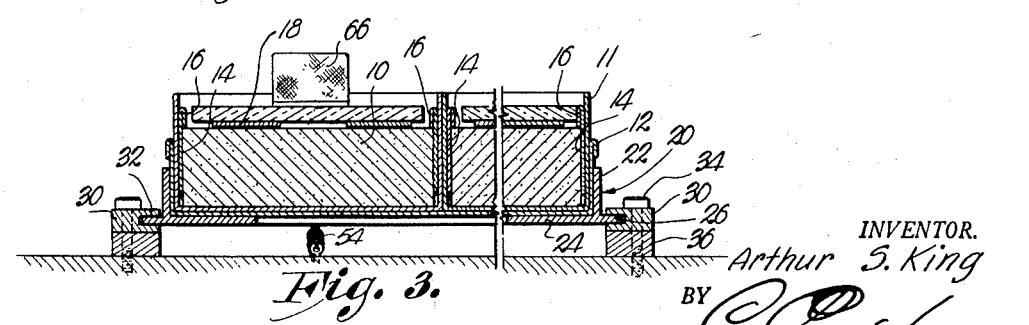
Fig. 3.
INVENTOR.
Arthur S. King
BY
ATTORNEY.

United States Patent Office 2,720,058
Patented Oct. 11, 1955

2,720,058

HONING MACHINE

Arthur S. King, Kansas City, Mo.

Application August 13, 1952, Serial No. 304,200

1 Claim. (Cl. 51—59)

This invention relates to the field of grinding and polishing, and more particularly to a machine for accurately honing elements that require extreme care in the manufacture thereof so far as dimensions are concerned, the primary object being to provide apparatus for automatically leveling a surface on a manufactured article without the need of expensive and inaccurate hand labor.

It is the most important object of the present invention to provide a machine that includes a reciprocable hone for freely and floatingly receiving articles of manufacture upon the uppermost face thereof to the end that as the hone is reciprocated, the articles will be moved with respect to the hone along rectilinear paths of travel, and grinding and polishing will take place by attrition.

Another object hereof is to provide a machine that includes a hone mounted for horizontal reciprocation along a rectilinear path of travel at a predetermined speed and a pre-selected distance of travel for shifting relatively small articles, loosely placed upon the uppermost surface of the hone to grind away the lower surfaces of the articles to a predetermined condition.

Other important objects lie in details of construction that include the way in which the machine may be adapted for receiving a large number of hones; the way in which the hones may be removed for cleaning and dressing; the manner of loosely positioning a weight upon relatively lightweight articles to hold the latter in tighter engagement with the hone during reciprocation; the way in which spring means is utilized to smooth-out the reciprocative action; and the manner of providing replaceable pans and hone-receiving cups to the end that a single operator may continuously remove finished articles and reload the machine to tremendously speed up the entire operation.

In the drawing:

Figure 1 is a fragmentary, top plan view of a honing machine made pursuant to my present invention, parts being broken away and in section for clearness.

Fig. 2 is a longitudinal, cross-sectional view taken on irregular line II—II of Fig. 1 looking in the direction of the arrows.

Fig. 3 is a transverse, cross-sectional view taken on line III—III of Fig. 2.

Fig. 4 is a plan view of an article to be finished through use of the honing machine hereof.

Fig. 5 is a cross-sectional view taken on line V—V of Fig. 4; and

Fig. 6 is an exploded, perspective view of a crystal holder that includes a pair of electrodes of the kind shown in Figs. 4 and 5.

The present invention has been developed primarily to meet a dire need in the field of manufacturing the component parts of crystal holders used in the field of radio. Crystal holders and similar electric fixtures are commonly provided with opposed plate-like electrodes for receiving the crystal therebetween. Such electrodes must be prepared with precision so that an air gap of predetermined limits is presented therebetween for receiving the crystal.

Heretofore the manufacture of such electrodes required a substantial amount of hand labor particularly in the polishing or grinding step, the operator being required to manually handle electrodes and to reciprocate the same across a hone or the like. This laborious task resulted in high costs of manufacture because of the fact that each operator could only finish a limited number of electrodes in a working day.

A still greater problem was the inability of the operator to attain a high degree of accuracy and a large number of electrodes would have to be rejected because the same failed to meet the requirements and were oftentimes scratched and, therefore, unusable. As will hereinafter appear, when the honing machine of the present invention is placed in use, all of the aforesaid difficulties are removed and while the following description will be predicated upon the grinding or polishing of such electrodes, it must be appreciated that the same is universally adapted for many other uses to finish articles differing substantially from component parts of crystal holders. The articles being of material incapable of handling by magnetic means, and too thin for grasping by chucks and the like, the problem has heretofore remained unsolved.

In Figure 1 of the drawing, there is shown a plurality of side-by-side, elongated hones 10, of conventional character in that the same are provided with opposed flat operating faces and are made from abrasive materials as is quite common. The hones 10 are each mounted within a relatively shallow cup 11 and the latter are received by a still shallower pan 12 and rest directly upon the bottom wall of the latter as is clear in Figs. 2 and 3 of the drawing.

Hones 10 are each flanked by a pair of elongated wedge members 14 extending longitudinally of the pan 12 and each member 14 is rebent upon itself along its uppermost longitudinal edge to present a down-turned flange 16 that bears against the uppermost edge of hone 10 adjacent its longitudinal marginal edges. In other words, each hone 10 respectively is provided with a pair of opposed, longitudinally extending members 14 and both of the uppermost marginal, longitudinal edges of the hones are engaged by the lowermost edges of the down-turned flanges 16. Hones 10 therefore, are all wedged rather tightly in place within the cups 11 and cannot shift in any direction, but are easily and quickly removable by merely slipping the members 14 upwardly. These articles will not tend to channel along the longitudinal edges of the hones 10 during reciprocation by virtue of the provision of flange portions 16.

Pan 12 is removably mounted within a polygonal frame, broadly designated by the numeral 20 within which it is seated. The frame 20 has an up-turned, continuous leg 22 that circumscribes the pan 12; a continuous, inturned, horizontal leg 24 that underlies and supports the pan 12; and a pair of opposed, longitudinally extending out-turned, horizontal legs 26.

The entire machine is mounted on a suitable support such as a table having a top 28, which supports the polygonal frame 20 through the medium of a pair of elongated, spaced-apart, parallel tracks 30 that are preferably horizontal and each provided with a continuous, longitudinally extending slot 32. The slots 32 are in facing relationship and slidably receive a corresponding leg 26 of the frame 20. Tracks 30 are mounted directly upon the tabletop 28 through the medium of a plurality of bolts or other fastening elements 34, and spacers 36 beneath the tracks 30 hold the latter elevated above the support 28. Reciprocable movement may be imparted to the frame 20 and accordingly, to the structure that is supported thereby, in any suitable manner and to this end there is provided a rotatable shaft 38 mounted in bearings 40 that are in turn carried by support 28. Shaft 38 is operably connected with the frame 20 through the medium of a connecting rod 42, having a sheave 44 for eccentrically receiving shaft 38. The opposite end of the rod 42 is received between the legs of a U-shaped bracket 46 secured directly to the continuous leg 22 at one end of the frame 20. A pivot pin 48 pivotally connects the rod 42 and the bracket 46.

Manifestly, a prime mover (not shown) is connected with the driven shaft 38 through the medium of a continuous belt 50 and a pulley 52 on shaft 38.

It is highly important that the speed of reciprocation of the hones 10, be accurately adjusted, and to this end, there is provided any suitable type of variable speed drive means. Such variance in speed may be adjusted by the utilization of a speed reducer of conventional character having speed adjusting means thereon; the pulley 52 may be of the variable speed type or any other suitable means may be utilized to accurately, easily and quickly predetermine the speed of rotation of shaft 38. It is also important that the extent of movement from one end of its path of travel to the other end thereof, be predetermined so far as the frame 20 is concerned, and therefore, the eccentricity of sheave 44 on shaft 38 is important.

The reciprocable movement of the hones 10 along a horizontal, rectilinear path of travel on the longitudinal axes of the hones 10, should be smoothed out so as to avoid any tendency for a jerking action, and therefore, a spring 54 is provided to yieldably hold the frame 20 biased away from the shaft 38. The spring 54 interconnects the support 28 and the leg 24 of frame 20 immediately behind the bracket 46 as illustrated in Figs. 1 and 2 of the drawing.

The article 18 shown in the drawing is an electrode that is used as a component part of a radio crystal holder 56 such as shown in Fig. 6 of the drawing. Normally, a pair of electrodes 18 are utilized to receive a crystal therebetween (not shown) and the two electrodes, together with the crystal itself, are disposed within a polygonal frame 58, there being a pair of opposed leaf springs or other resilient means within the holder 56 that bear against the two electrodes 18 and hold the same biased toward each other.

Electrodes 18 must be precisely ground, particularly so far as a plurality of feet 60 thereon, are concerned. Feet 60 must be absolutely flat on their faces and the area 62 of the electrode 18 devoid of feet 60 or therebetween, must not be scratched or otherwise mutilated in any manner. Such scratching seriously affects the operation of the crystal, and electrodes of this kind must be discarded. The feet 60 are initially formed in the metallic material from which the electrode 18 is made, by a stamping process as is well known in this art, and the air gap is determined by the distance between the faces of the feet 60 and the proximal face 62 of the electrode 18.

Actually, in testing, the electrodes 18 are segregated according to the amount of air that will escape around the feet 60 when the electrode 18 is subjected to a test by means of a conventional air gauge. By way of example, an air gap of 0.0007 is quite common in one class of electrodes, and it is therefore, seen that the nature of feet 60 is highly important and the gap provided thereby, highly critical.

The electrodes 18 are placed directly upon the upper surfaces of the hones 10 as illustrated in Figs. 1, 2 and 3 of the drawing, whereupon any suitable weight 64 is placed upon the electrodes 18. Obviously, the electrodes 18 rest upon the hones 10 with the feet 60 down and the weight 64 tends to hold such feet 60 in tight, flat engagement with the hone 10.

Any suitable handle 66 may be provided for facilitating the handling of the weights 64. It is noted that the weights 64 chosen for illustration, constitute a sheet of glass, but the same may be made from any suitable material and it has been found that in some cases, rubber weights are satisfactory and it is important that the weights 64 be narrower than the distance between opposed flanges 16 and be shorter than the over-all length of the hone 10 so that the weights 64 are free to shift with respect to the hones 10 and the electrodes 18 during operation of the machine. Weights 64 are advantageous when relatively light articles 18 are loosely placed on hones 10 for free, floating reciprocation thereon to enhance attrition and speed up the operation. When heavier articles are ground, no weight is needed.

There is illustrated fragmentarily in Fig. 1 of the drawing, another rod 68 of the same nature as rod 42 and mounted on the shaft 38. It is seen therefore, that a plurality of assemblies that include the frames 20 and pans 12, may be provided in opposed relationship. By the same token, shaft 38 could be extended to any desired length and a pair of opposed rows of assemblies could be simultaneously operated as desired.

A single attendant can lift the pan 12 from the frame 20 and place another pan therein quickly and easily. Therefore, while the machine is in operation, finished electrodes 18 may be removed and a new group of electrodes 18 placed on the plurality of hones 10 for mounting upon the frame 20.

Suitable timing means for the prime mover, not herein shown, should be provided so that the exact amount of grinding away of the feet 60 can be predetermined. By way of example, the machine may be set for fifteen minute operation during which time the operator is preparing additional sets of pans 12 for replacement on a plurality of frames 20. It is to be understood further, that any number of hones 10 may be provided in each pan 12, the dimensions of the latter being determinative.

It can now be appreciated that the speed in which this particular operation can take place is tremendously increased over the traditional hand method of grinding each individual electrode 18 upon a hone. Furthermore, an even grinding away is accomplished since the electrodes 18 are held flat on the hones 10 by the weights 64, and there is no tipping during the grinding action as is the tendency in hand honing, or when curvilinear action or some motion differing from that herein contemplated, is imparted to the articles.

Finally, when pressure is placed upon an electrode such as at 18 by the finger of an operator, it is very difficult to avoid scratching of the surface 62, whereas, through use of the honing machine hereof, no such scratching takes place. The articles 18 assume various positions on the hone 10 during the period of grinding, since they are free to shift and rotate with the hone 10 and the weight 64 as well as with respect thereto.

More particularly, the motion of the articles is in alternate directions along rectilinear paths of travel with respect to the hones. The frictional engagement of the articles tending to cause the same to move with the hones is overcome by reciprocation of the latter. Inertia, tending to cause the articles to remain at rest, as well as momentum which causes the articles to continue in the straight line along which the same are motivated, results in rectilinear reciprocation of the articles relative to the hones, causing the grinding action by attrition.

Following the grinding operation, the electrodes are each individually tested and it has been found that the same come within a rather close range so far as air gap is concerned, and furthermore, all four feet 60 are flat and virtually of identical size.

While members 10 are herein specified as hones, all that is needed is an uppermost, horizontal, grinding surface. Thus, a sheet of glass or other material, having emery dust or powder or other abrasive substance thereon, which may be mixed with water or other liquid, has been found to be very useful for many purposes.

It must be emphasized again that the honing machine hereof has many other uses differing from the particular application in the manufacture of crystal electrodes, and therefore, such other uses, as well as forms of the machine itself, as fairly come within the spirit of this invention, are contemplated hereby.

Having thus described the invention what is claimed as new and desired to be secured by Letters Patent is:

In an article grinding machine, a horizontally reciprocable frame; a polygonal block member having an uppermost, flat, grinding surface adapted to slidably receive a plurality of articles; means releasably mounting said member on said frame for reciprocation therewith; and a polygonal plate resting on said articles in overlying relationship to said surface and supported solely by its contact with the articles, said articles being freely slidable relative to the member upon reciprocation of the latter, said plate being at the same time slidable on the articles relative thereto and to the member, said mounting means including an open top receptacle having an upstanding side wall surrounding said member, and wedge elements between said wall and said member, said elements being provided with downturned flanges overlying the marginal edges of said surface whereby the extent of relative sliding movement of said articles and said plate is limited to the area of said surface between said flanges.

References Cited in the file of this patent

UNITED STATES PATENTS

| | | |
|---|---|---|
| 240,226 | Brooks | Apr. 19, 1881 |
| 453,661 | Reynolds | June 9, 1891 |
| 1,141,095 | Ackerman | June 1, 1915 |
| 1,146,513 | Perkins | July 13, 1915 |
| 1,486,344 | Hoke | Mar. 11, 1924 |
| 1,647,203 | Smith | Nov. 1, 1927 |
| 1,719,965 | Bruhl | July 7, 1929 |
| 1,870,736 | Keller | Aug. 9, 1932 |
| 1,930,383 | Chapellman | Oct. 10, 1933 |